June 26, 1934.  W. A. ADAMS  1,963,947
WORKBENCH
Filed Jan. 21, 1933  4 Sheets-Sheet 1
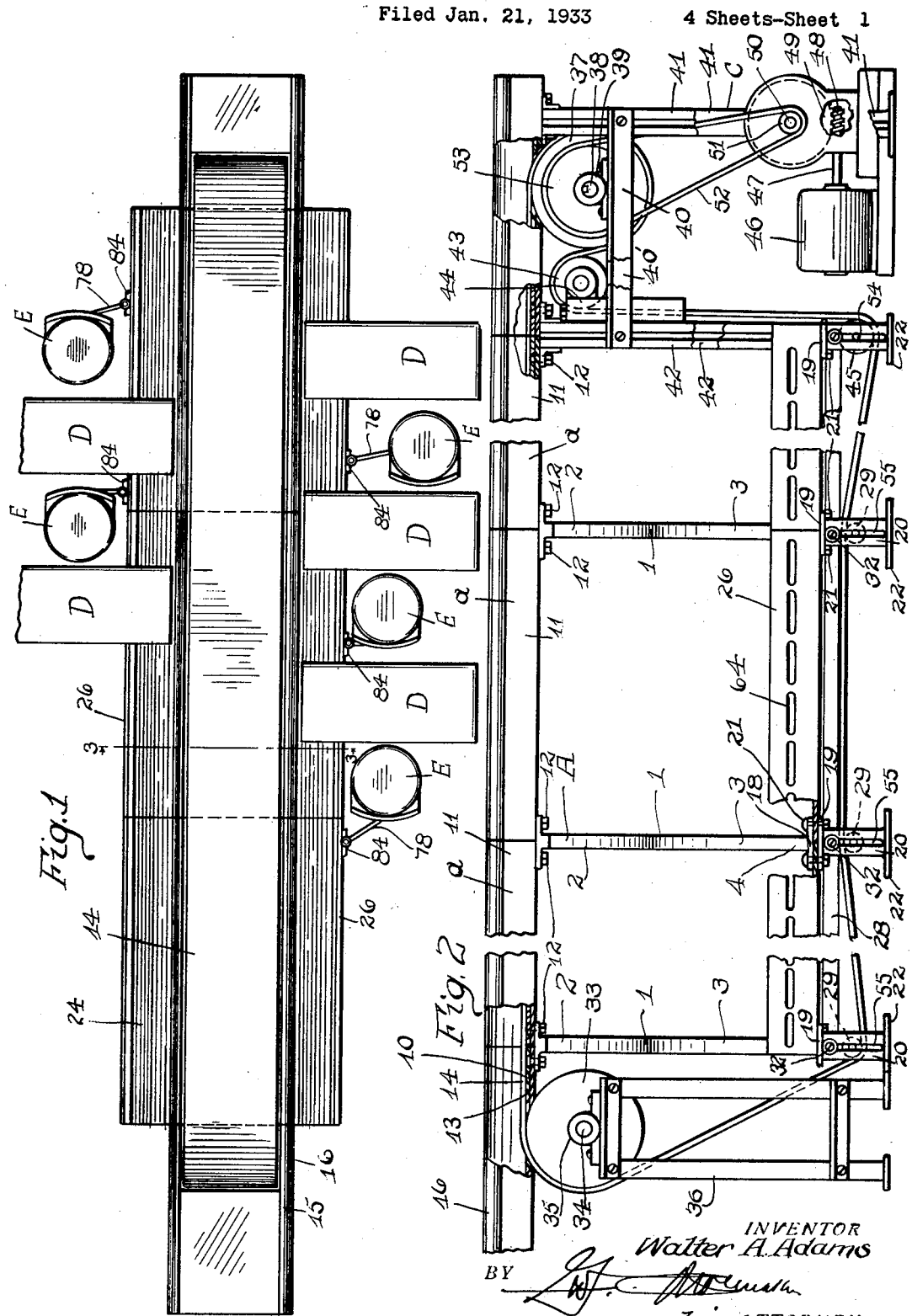
INVENTOR
Walter A. Adams
BY
his ATTORNEY

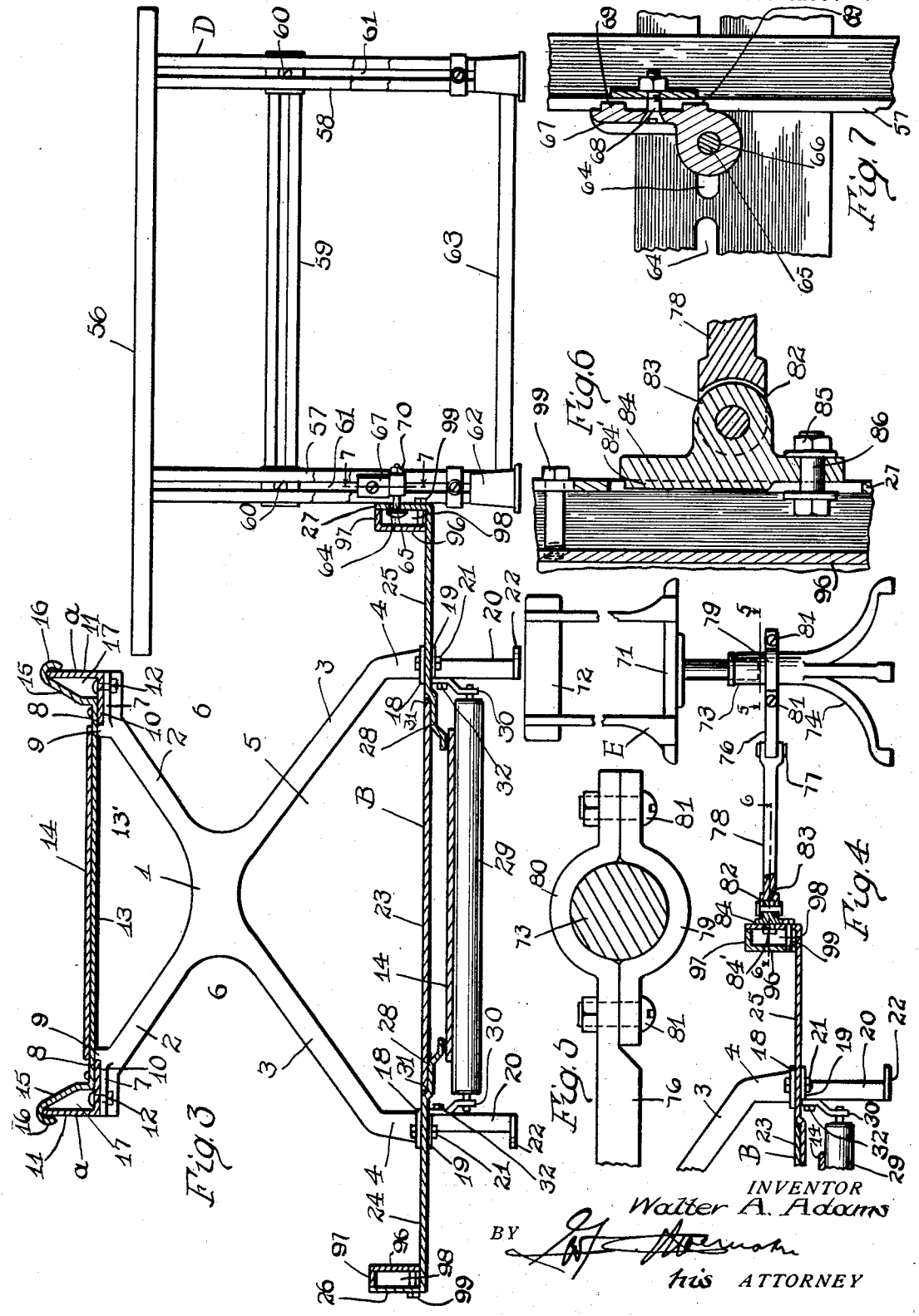

June 26, 1934.   W. A. ADAMS   1,963,947
WORKBENCH
Filed Jan. 21, 1933   4 Sheets-Sheet 3
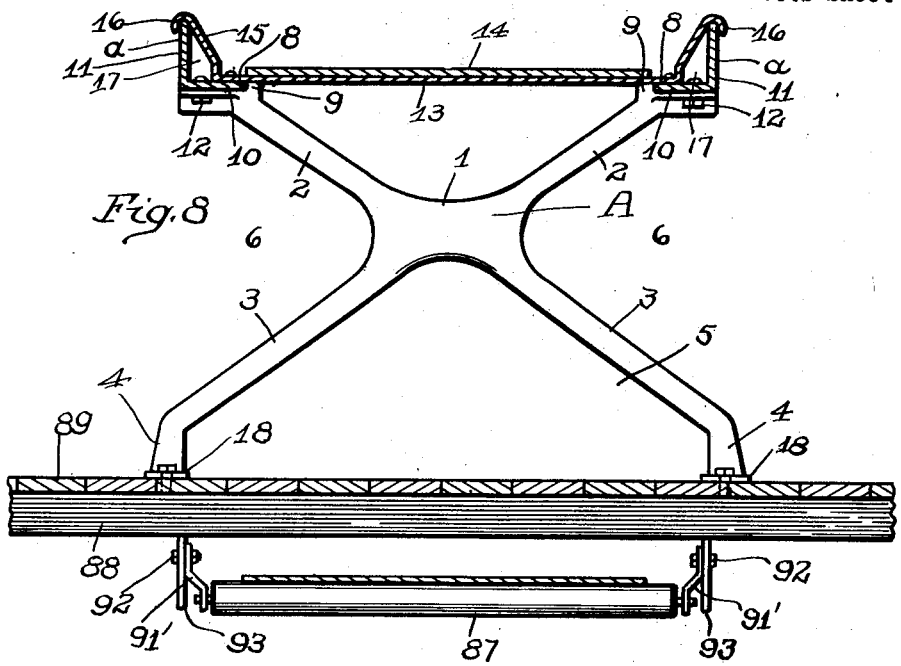
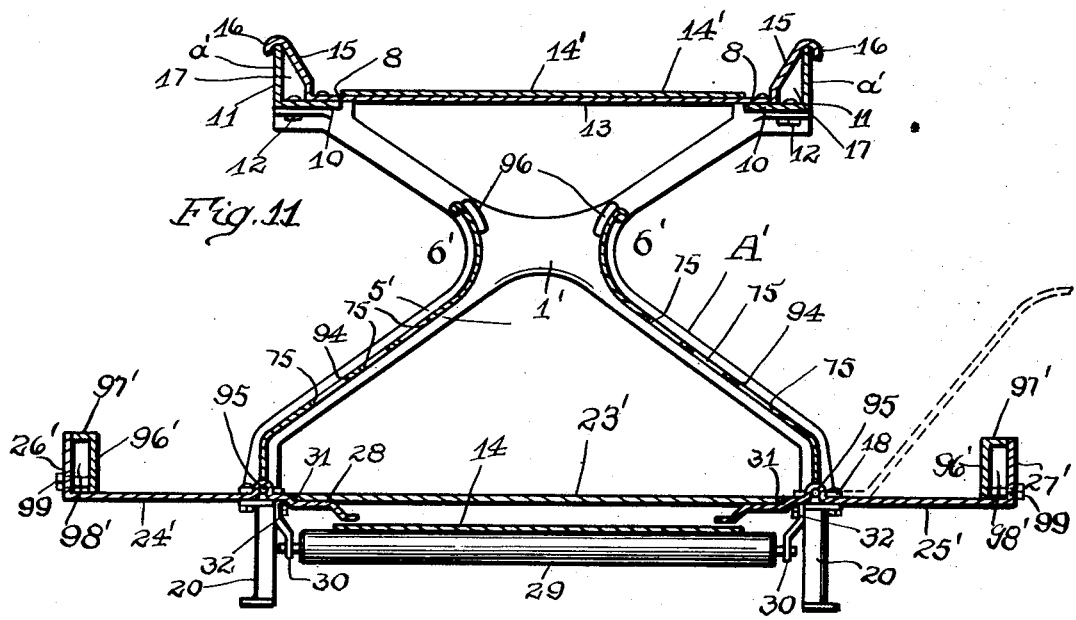
INVENTOR
Walter A. Adams
BY
his ATTORNEY

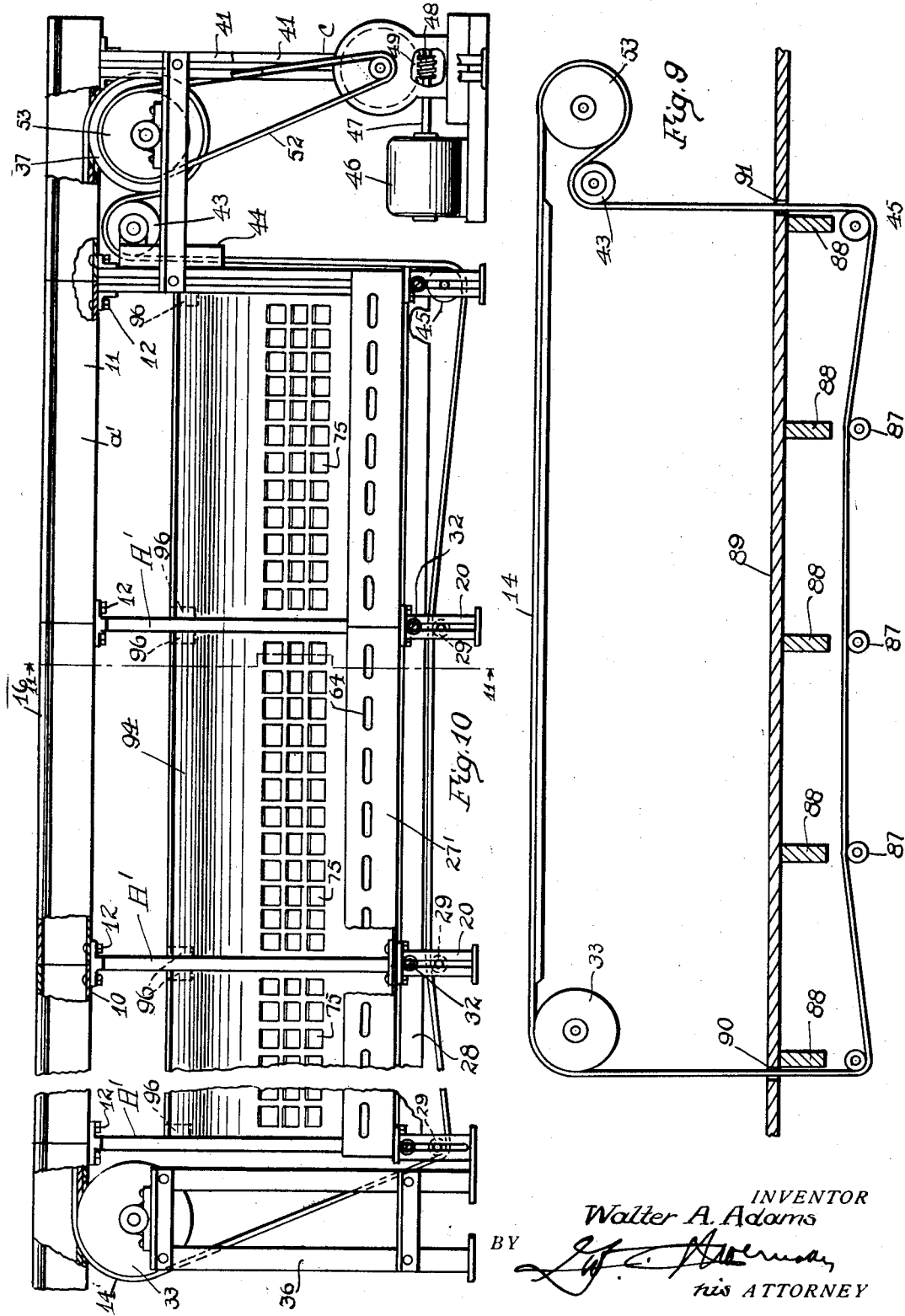

Patented June 26, 1934

1,963,947

UNITED STATES PATENT OFFICE 1,963,947

WORKBENCH

Walter A. Adams, Rochester, N. Y.

Application January 21, 1933, Serial No. 652,907

15 Claims. (Cl. 198—19)

This invention relates to work benches.

In factories and other plants it is customary to install numerous benches, tables, chairs and other equipment, with some of the equipment provided with sewing machines and other operating devices calculated for the expedition of work and for the comfort of the operatives, and if the work benches, tables, chairs and other equipment were arranged in anything but a permanent manner there would be danger of confusion in the event of fires, riots, panics or other reasons because of the equipment such as benches, tables, chairs and other movable equipment preventing speedy and prompt exit of the operatives from the building, if not entirely preventing their safe exit therefrom.

Rigid laws and rules are applied in the matter of factory and other plants which necessitate care and more or less exactitude in the matter of industrial equipment, both as to character and arrangement. Aside from the comfort of the operatives the equipment must be arranged so as to provide for aisles of definite widths and which must be maintained clear at all times under specific regulations so as to prevent confusion and the placing of obstructions in the aisles in the event of a fire, riot, panic or for any other cause which might arise requiring a hasty exit of operatives from the building.

In large industrial plants employing many operatives it is not only essential to provide for the comfort and safety of the operatives but it is also essential to effect economy by way of providing against waste of space and unnecessary loss of time in the handling of work conducted in the plant.

In many industrial plants it is the custom to use trucks for the purpose of transporting work throughout the plant or a portion thereof so as to supply work to various operatives and to collect work from the operatives for delivery to another operative or to some particular point in the plant, and these trucks in transit are required to pass through aisles between operatives and in the event of a fire, riot, panic or due to need for any other reason for operatives to make a hasty exit from the building, these trucks entirely block or impede progress of exit by reason of obstructing aisles and as they can be pushed from one place to another at the will of operatives, it is clear that it is highly essential to obviate the use of these trucks and minimize obstructions or other hazards in aisles or exits by their elimination.

It is therefore one object of the present invention to provide means constructed and arranged to effect expeditious handling of the work in such a manner as to insure economy in operations and maintain clear aisles at all times for the exit of operatives, eliminating the use of trucks and obviating possibilities of equipment being disarranged and particularly preventing benches, tables, chairs, work, et cetera from being thrust into aisles in times of emergencies, maintaining the aisles always clear and the chairs of the operatives always in their proper working positions and out of the aisles.

Another object of the invention resides in the provision of a framework including spaced transversely disposed frame sections connected together in their spaced relation and a traveling endless conveyor arranged to travel above and below said frames with work supports projecting laterally outwardly from opposite sides of the framework at a level substantially opposite the level of the lower lap of the endless conveyor, the transverse frames having recesses in opposite sides between the upper and lower ends thereof so as to permit unobstructed access to the lower lap of the conveyor.

Another object of the invention is to provide a framework over which an endless conveyor is adapted to operate with the framework including a work support arranged between the upper and lower laps of the conveyor and including spaced, fixed side sections and an intermediate section, said intermediate section being removable from between said side sections if desired.

It is still further designed to provide a substantial fire-proof structure comparatively inexpensive, durable and efficient in operation and which is constructed of sections whereby to provide for ready assembling of the various parts to expedite installation and expansion and which may be quickly and readily disassembled for shipping, storing or other purposes.

With these and other objects in view, the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings:

Figure 1 is a top plan view of one embodiment of the invention in more or less diagrammatic outline.

Figure 2 is a side elevation of the invention, parts being broken away.

Figure 3 is a transverse sectional view on the line 3—3 of Figure 1.

Figure 4 is a detail fragmentary view showing particularly one means of connecting the chair to the equipment.

Figure 5 is a detail sectional view on the line 5—5 of Figure 4.

Figure 6 is an enlarged detail sectional view on the line 6—6 of Figure 4.

Figure 7 is an enlarged detail horizontal sectional view on the line 7—7 of Figure 3.

Figure 8 is a sectional view of a modified form of the invention.

Figure 9 is a diagrammatic side view of the modification illustrated in Figure 8.

Figure 10 is a side elevation of another modified form of the invention; and

Figure 11 is a transverse sectional view on the line 11—11 of Figure 10.

Referring now more particularly to the accompanying drawings, there is shown a framework composed of transversely disposed, spaced frame sections A of substantially X-shaped formation, each including a substantially central body portion 1 having upwardly and outwardly diverging arms 2 and downwardly and outwardly diverging legs 3 having feet 4, resulting in the formation of a lower opening 5 below the body portion 1 and an upper opening 13' above the body portion 1 and providing outwardly opening recesses 6 at each side of each frame section A for a purpose presently understood. The body portion 1 of each frame section A constitutes a supporting element on which articles of various kinds may be supported between the frames.

The arms 2 of the frame sections A have their outer ends directed outwardly laterally providing longitudinal flanges 7 and recessed as at 8 providing the shoulders 9. These recesses 8 are adapted to receive the lower flange 10 of substantially L-shaped connecting metal strips $a$, whose other flanges 11 are directed upwardly, as shown. The lower flanges 10 of each L-shaped connecting strip $a$ are preferably of a thickness substantially the depth of the respective recesses 8 and have their inner edges bearing against the respective shoulders 9. These L-shaped connecting strips $a$ are bolted or otherwise secured to the spaced frame sections A, as shown at 12, and it will be understood that these connecting strips $a$ are made up in sections preferably of lengths substantially the same as the distance between the spaced frame sections A so that the framework of the supporting structure of the present invention may be built up in sections of various lengths, according to desires and needs.

The reference character 13 indicates a metallic or other plate of sufficient strength to effectively serve as a supporting means to prevent sagging of the leather or other belt 14. This means for preventing sagging of the belt 14 is preferably made up in sections according to the distance between the metal frame section members 13. These sectional members 13 of the means for preventing sagging of the belt 14 rest at their longitudinal edges upon the respective shoulders 9 and upon the lower flanges of the respective L-shaped connecting members $a$ and along their longitudinal edges these sections 13 have upwardly and outwardly extending flanges 15 provided at their outer longitudinal edges with hook formations 16 adapted to straddle or extend over the upper edges of the upwardly directed flange portions 11 of the L-shaped connecting strips $a$. The connecting members $a$ and the members 13 with their flanges 15 and formation 16 abut with adjacent similar members in the building up of the structure. Flanges 15 of the members 13 provide retaining walls at the sides of the conveyor or belt 14 to prevent clothing, fabric or other articles from falling off the sides of the conveyor belt 14 and the construction of these flanges 15 with relation to the L-shaped members $a$ is such that spaces 17 are provided along opposite sides of the conveyor belt 14 which may be utilized, if desired, for installation of electric wires or for other purposes.

The feet 4 of the legs 3 of each frame section member A are provided with flanges 18 adapted to be bolted to flanges 19 at the upper ends of supporting posts 20 by means of bolts 21. The posts 20 may have flanges 22 by which the posts may be bolted or otherwise secured to a floor or other supporting means.

The reference character B indicates a work support which, as shown, is arranged between the upper and lower laps of the conveyor belt 14 and this work support is composed preferably of metal and it may be in one piece or in sections, including an intermediate section 23 and side sections 24 and 25, but in any event, this work support 23, whether arranged between the upper and lower laps of the conveyor belt 14 or otherwise arranged, as will be later understood, is preferably of a width considerably greater than the width of the conveyor belt and extends beyond both sides of the belt and the frame sections A. If the work support B is formed in sections the side sections 24 and 25 may be secured between the flanges of the feet 4 and the upper ends of the posts 20 by the same bolts 21 which connect the feet 4 and the posts 20 together, and these side sections 24 and 25 of the work support each has an upwardly directed flange 26 and 27 respectively. The inner longitudinal edges of the work support sections 24 and 25 may be provided with downwardly directed flange portions 28 leading toward the rollers 29 journalled at their ends in brackets 30 for the support of the lower lap of the conveyor belt 14 so as to permit materials on the lower lap of the conveyor belt in movement thereon to return to the charging end of the work bench and from falling off the sides of said lower lap of the conveyor belt. Each flange 28 is preferably provided with a step 31 adapted to removably receive and support the intermediate section 23 of the work support B which is removable for the purpose of permitting use of the lower lap of the conveyor belt for return of goods to the charging or loading end of the work bench, if desired, or which need not be removed, under certain conditions, so as to permit the storage of garments or goods on the intermediate section 23 of the work support for access by the operators through the spaces between the frame sections A, the recesses 6 providing for unobstructed access to the intermediate work support section 23 or to the lower lap of the conveyor belt A. The work on the intermediate section 23 of the work support B may be pushed by hand or otherwise across or along the intermediate section 23 of the work table B through the lower openings 5 in the frame sections A and, of course, goods on the lower lap of the conveyor belt 14 may be readily transported thereby through said openings 5 from the discharge of the work bench to the charging or loading end thereof. The brackets 30 in which the rollers 29 are journalled may be supported from the structure by other forms of brackets than those shown and in any suitable manner but, as shown, these brackets 30 are secured to the posts 20 by means of bolts or other suitable fastenings 32.

The conveyor 14 passes over a roller 33 on a shaft 34 journaled in suitable bearings 35 secured to a metal or other support 36 located at the front loading or charging end of the work bench and passes horizontally over the plate or plates 13 to a roller 37 keyed to shaft 38 journaled in bearings 39 secured to the cross pieces 40—40' between the front and rear legs 41 and 42, respectively, of the metal support C at the discharge end of the work bench, there being a pair of front legs 41 and a pair of rear legs 42, as shown in Figure 2.

The conveyor belt 14 continues around roller 37 and upwardly over a common belt takeup 44 carrying pulley 43 and secured on frame C and thence downwardly over a roller 45 journaled in the rear legs 42 of frame C and thence over the aforesaid rollers 29 to the roller 33.

The conveyor belt 14 is operated in any suitable manner, preferably by an electric motor 46, whose drive shaft 47 carries a worm 48 which meshes with a worm gear 49 keyed on shaft 50 journaled in the front legs 41 of frame C. This shaft 50 may be otherwise journaled in frame C.

A pulley 51 is keyed on the shaft 50 adjacent said worm gear 49 to receive one end of the endless drive belt 52 operatively connected at its other end with a pulley 53 keyed to the aforesaid shaft 38 adjacent the aforesaid roller 37 whereby to operate the work bench or endless conveyor belt 14.

The rear legs 42 of the support C are slotted, as at 54, as are also the posts 20 slotted at 55 so as to provide for vertical adjustments of the rollers, if necessary. The legs 41 and 42 and posts 20 may be formed of spaced channel iron members, as shown, but the structure may be altered in this respect.

Tables D extend in spaced relation laterally from the work bench. These tables may be composed of metal or of any other suitable material. Each table includes a top 56 and pairs of inner and outer legs 57 and 58, respectively, formed of spaced channel irons or otherwise, and the respective inner and outer legs may be connected by the adjustable braces 59 secured by bolts 60 in the slots 61 of the legs. These legs 57 and 58, no matter how formed, are preferably secured in sockets of feet 62 connected by the cross pieces 63. The tables are preferably formed alike and they are preferably rigidly or fixedly connected to opposite sides of the work support or other part of the equipment. In this instance, the flanges 26 and 27 of the side sections 24 and 25 of the work support, are each provided with a line of short spaced slots 64 adapted to receive the bolts 65 passed through eyes 66 in lug 67 secured by a bolt 68 or otherwise to inner pair of legs 57 of the respective tables D. Each lug preferably carries ribs 69 on its rear face to fit in the respective slot 61 of the inner legs 57 to prevent turning of the lugs against lossening of the securing nuts 70 on the bolts 68. Thus the lugs 67 are vertically adjustable in the slots 61 of the inner legs 57. It will also be seen that the tables are firmly connected to the equipment and that they may be adjusted longitudinally along the frame work of the bench by reason of the bolts 65 operating in the slots 64 of the side retaining flanges 26 and 27 of the work support B and be arranged different distances apart, according to work or requirements and may be readily connected up with the framework or disconnected therefrom for shipping, storing or other purposes.

Chairs E for operatives are located between the tables in such a manner as to be shifted from one position to another within the space between the tables D and yet be maintained between the work bench and the outer ends of the tables so as to be restrained from being pushed out beyond the outer ends of the tables or into an aisle, which would be objectionable in the event that this equipment be located in a narrow room or in the event that there be a plurality of work benches located in parallelism in a room or building with just sufficient space between the benches and walls to provide the necessary width to aisles. One way in which the chairs E may be thus restrained is to tie them to the work bench structure or other part of the equipment. For instance, each chair has a seat 71 and a back 72 and is of swivel type, having a pedestal 73 and being mounted upon a base 74. An arm 76 is pivotally connected at 77 to an arm 78 and it is secured to the pedestal 73 in any suitable manner as by means of a clamp consisting of a member 79 carried by arm 76 cooperating with a clamping member 80 to loosely embrace the pedestal 73 and secured by the bolts 81. The arm 78 of each connection 76—78 has its outer end bifurcated to provide spaced ears 82 adapted to embrace a projection 83 extending from a plate 84 having a rearwardly directed rib 84' extending into one of the aforesaid slots 64 of the respective side flanges 26—27 of the work support to prevent turning of the plate 84 in the event of loosening of the securing nuts 85 of the bolts 86 which pass through each of said plates 84 and the corresponding flange at the respective side of the work support. Thus the chairs are in fact flexibly connected for various movements between the tables and positively confined in the space between the tables for the purposes hereinbefore outlined. The chairs may be swung on their swivels to have their backs arranged so that the operatives may take work from or place work on the travelling work bench from the left or right side, as is obvious.

In Figures 8 and 9 there is shown more or less diagrammatically a modified form of the invention as regards the mounting of the lower endless belt rollers and otherwise the structure hereinbefore described is the same. In this modified structure the lower rollers 87 for the endless belt conveyor are suspended from the ceiling beam or rafter 88 immediately beneath the floor 89 on which the equipment is mounted, there being openings 90 and 91 in the floor to permit the laps of the endless belt 14 to pass to and from said rollers 87 which latter are journaled in bearing brackets 91' secured by suitable fastenings 92 to the hangers 93 suspended from the ceiling beams 88. It is believed that as the only difference between this modified form of the invention and the form first described resides in passing the belt conveyor through openings in the floor to space below the floor rather than have the lower rollers mounted directly on the framework structure that the illustration of Figures 8 and 9 is sufficient for illustrative purposes.

In Figures 10 and 11 there is illustrated a form of invention similar in all respects to the first form described except that I provide a plurality of closures 94, one for each space between the transverse frame sections A' which are the same in form as the transverse frame sections A. By virtue of these covers or closures 94 the intermediate section 23' of the work support or the lower return lap of the conveyor belt 14' and the goods thereon may be seen by the operatives through openings 75 formed in the closures which latter as a matter of fact may be composed of wire mesh or other foraminated material to provide for the necessary visibility. Under certain conditions these closures may be of imperforate material or other suitable material but where view openings are provided the operatives may readily see the goods on the work support sections on the lower lap of the belt without opening the closures. Upon shifting the closures 94 on their mountings, in this instance, in the form of hinges 95, by which each closure is connected at its lower edge to the respective side work support sections 24'—25' between the respective transverse frame sections A', unobstructed access may be had to the intermediate work support section 23' or to the lower lap of the belt or to the goods thereon through the intermediate recesses 6'. These closures, when closed, fit between and within the outer surfaces of the transverse frame sections and they are shaped in accordance with the shape of the sections A' so as not to destroy the effect and purpose of the recesses 6' at opposite sides of the frame. The upper edge of each closure 94 normally lies against the stops 96 formed on the transverse frame sections A' and as the upper edges of the closures 94 terminate at or substantially at the upper edge of the web 1' of sections A' the closures may be easily and readily swung by an operative on the hinges 95 to the position indicated by dotted lines in Figure 11 to permit access to the passage 5' or to the intermediate work support section 23' or to the lower return lap of the conveyor belt 14', as may be desired. With the exception of the closures 94 the structure of Figures 10 and 11 is the same as the structure first described herein.

In the structures illustrated in Figures 1 to 7, inclusive, and in Figures 10 and 11, there may be provided a relatively narrow plate 96' having a flange 97' at its upper edge to engage the edge flanges 26' and 27', respectively, of the work support and maintain the plates 96' spaced from the said flanges to provide conduits 98' for installation of electric wiring (not shown), if desired, said plates 96' being secured by bolts 99.

From the foregoing it will be understood that the work bench structure is built up in sections and it is also to be understood that the intermediate sections may be the same in length or vary in length and that the work bench may be of any suitable length according to size of plant or demands. Any suitable end sections may be employed and secured to the adjacent intermediate sections in any suitable manner.

It will also be understood that the tables may be spaced different distances apart and that they are adjustably tied to the work bench structure and that the chairs arranged between the tables are tied in position between the tables and adjustable and movable to various positions between the tables for the comfort or needs of the operatives.

It will also be understood that the clothing, fabrics or other articles to be worked upon are placed on the conveyor belt at the front or charging end of the traveling work bench and conveyed to any point therebetween and the discharge end of the traveling work bench or returned from the discharge end on the lower or return lap to the front or charging end, eliminating the use of trucks in the room or building.

The entire structure with the possible exception of the traveling endless belt is composed preferably of metal or other fire resisting material and tied together for the purpose of reducing fire and other hazards.

There are times when it will be desired to form the work support sections of one piece of sheet metal or other suitable material rather than in the side by side arrangement of sections illustrated, and particularly will this one piece type of work support be employed when the lower lap of the belt is not utilized to carry goods, in which event, the depending stepped portions 28 of the side work supports are eliminated. However, it will be understood that the one piece work support will be of the same dimensions with regard to width as the sectional form of work support and it will also be understood that the lengths of the one piece work support may vary in harmony with the sectional type of structure. The intermediate sections of the sectional work support, if used, need not be removed, if placed in the equipment, if it be desired, not to utilize the return lap of the belt for carrying purposes. Furthermore, in the forms of invention illustrated in Figures 1 to 7 inclusive, and in Figures 10 and 11, it may be desired to not utilize the return lap of the belt for carrying purposes and yet it might be desired to retain portions at least of the itnermediate parts 23—23' of the work support for storage purposes. In such an arrangement as that just alluded to, a part of the lower lap of the belt would be exposed for carrying purposes and which exposed part of the belt for carrying purposes might be utilized between spaced portions 23—23' of the work support. The intermediate work section is not employed at all in the form of equipment shown in Figures 8 and 9 wherein the work support 23 is entirely eliminated. The movably mounted closures 94 in Figures 10 and 11, when used, constitute chutes to facilitate deposit of goods or articles either on the work support or return lap of the belt, as the case may be, as for instance when moved to the dotted line position shown in Figure 11 the goods may roll or slide down the inner faces of the closures into the passageway 5'.

It will be apparent from the foregoing that when the closures 94 are employed that they, together with the transversely disclosed frames A effect what might be termed partitions or walls extending between the continuous passage 5 and the side work supports 24—25 and, of course, it will be understood that under certain conditions the work supports 24—25 are used without the intermediate work support section.

It will be apparent that by virtue of the spaces 13' at the upper portions of the transverse frames between the upper diverging arms 2 thereof, passages are provided for the support of various articles between transverse frames and that such spaces might well be utilized for the installation of electrical wiring, air pipes, steam pipes, vacuum pipes, et cetera (not shown) because of the continuous passage formed by the openings 13'.

What is claimed is:

1. In a work conveyor, the combination with a conveyor, of a framework including a plurality of spaced transverse frame sections supporting said conveyor, a work support arranged below the upper lap of the conveyor and supported on said framework with the longitudinal edges thereof lying laterally beyond the sides of the framework and the conveyor, and retaining members which are substantially rectangular in construction and hollow and which provide conduits arranged longitudinally at the longitudinal side edges of the work support and which conduits are closed at their bottoms.

2. In a work conveyor, the combination with a conveyor, of a framework including a plurality of spaced transverse frame sections supporting said conveyor, a work support arranged below the upper lap of the conveyor and supported on said framework, the longitudinal outer edges of the work support having upwardly directed flanges, an angular shaped member disposed longitudinally of each of said flanges and having one web thereof engaging the inner face of the respective flange and the other web thereof resting upon the upper face of the work support in spaced relation to the respective flange of the work support, and means for connecting the respective flanges and angular shaped members in fixed relation and thereby providing retaining walls and conduits along the opposite longitudinal side edges of the work support.

3. In a work bench, the combination with an endless belt, the upper lap of which constitutes a work conveyor, of means for supporting the upper lap of the belt against sagging, a plurality of spaced transverse frame sections connected together in spaced relation to provide a framework for the support of said endless belt conveyor, a work support mounted on the framework below the upper lap of said belt conveyor and extending laterally beyond the sides of said transverse frames, and a closure for each space between the transverse frames and hinged at its lower end in alignment with the lower portions of the transverse frames and when open extending over the laterally extending portions of the work support and providing a chute down which articles may slide through the space between the respective frame sections onto the work support inwardly beyond the line of hinge connection between the respective closure and the work support.

4. In a work bench, the combination with an endless belt, of a plurality of transverse frame sections connected together in spaced relation for the support of the endless belt, a work support below the upper lap of the belt and composed of two fixed side sections and an intermediate removable section, the lower lap of the endless belt travelling under said intermediate work support section, said work support being adapted to receive and support work under the upper lap of the belt and also beyond the side edges of the belt and said intermediate section of the work support being removable to expose the lower lap of the belt so as to convey goods on the lower lap of the belt toward the charging end of the belt.

5. In a work bench, the combination with an endless belt, of a plurality of transverse frame sections connected together in spaced relation for the support of the endless belt, a work support below the upper lap of the belt and composed of two fixed side sections and an intermediate removable section, the lower lap of the endless belt travelling under said intermediate work support section, said work support being adapted to receive and support work under the upper lap of the belt and also beyond the side edges of the belt and said intermediate section of the work support being removable to expose the lower lap of the belt so as to convey goods on the lower lap of the belt toward the charging end of the belt, and a movable closure for each space between each pair of transverse frame sections so as to enclose the intermediate work support section and to guard and shield the lower lap of the belt when the intermediate work support section is removed.

6. In a work bench, the combination with an endless belt, the upper lap of which constitutes a work conveyor, of means for supporting the upper lap of the belt against sagging, a plurality of spaced transverse frame sections connected together in spaced relation to provide a framework for the support of said endless belt conveyor, a work support mounted on the framework below the upper lap of said belt conveyor and extending laterally beyond the sides of said transverse frames, a closure for each space between the transverse frames and hinged at its lower ends in alignment with the lower portions of the transverse frames and when open extending over the laterally extending portions of the work support and providing a chute down which articles may slide through the space between the respective frame sections onto the work support inwardly beyond the line of hinge connection between the respective closure and the work support, and stops projecting laterally from opposite sides of each transverse frame section to limit inward movement of the respective closures with relation to the respective transverse frame sections.

7. In a work bench, the combination with an endless belt, of means to prevent sagging of the upper lap of the belt, transversely disposed frame sections connected together and including spaced legs having feet, posts upon which said feet are mounted, a work support having portions extending between the feet of the legs of the transverse sections and the respective posts, and means coacting with the feet and the posts and the work support to secure the same together.

8. In a work bench, the combination with an endless belt, of means to prevent sagging of the upper lap of the belt, transversely disposed frame sections connected together and including spaced legs having feet, posts upon which said feet are mounted, a work support having portions extending between the feet of the legs of the transverse sections and the respective posts and means coacting with the feet and the posts and the work support to secure the same together, and rollers adjustably journaled in the posts below the work support over which the lower lap of the belt runs.

9. A work bench comprising transversely extending frames having recesses in opposite sides thereof, means for connecting said frames together including upstanding flanges at opposite sides of the frames at the upper portions thereof, a plate disposed upon the upper portions of the frames between said flanges and having its edges directed upwardly and outwardly over the upper edges of said flanges and cooperating with the latter to form retaining means and continuous conduits along opposite sides of the frames at the tops of said transverse frames.

10. A work bench comprising transversely extending frames having recesses in opposite sides thereof, means for connecting said frames together including upstanding flanges at opposite sides of the frames at the upper portions thereof, a plate disposed upon the upper portions of the frames between said flanges and having its edges directed upwardly and outwardly over the upper edges of said flanges and cooperating with the latter to form retaining means and conduits along opposite sides of the frames and which conduits are open at their ends only, and a conveyor belt operating over said plate between said conduits.

11. In a work bench, the combination with a supporting means, of transverse open frames mounted on said supporting means, work supports extending laterally from opposite sides of the supporting means, rollers mounted in said supporting means, a belt mounted to travel over the frames and over said rollers to carry articles on the upper lap thereof over the frames and to carry articles on the lower lap thereof through the frames, and a movable closure hinged on the work support between the transverse frames to guard and shield the lower lap of the belt and having an opening therein whereby articles on the lower lap of the belt may be seen through the closure.

12. In a work bench, the combination with a supporting means, of transverse frames mounted on said supporting means, a work support mounted between the supporting means and the transverse frames and extending laterally from the supporting means and at its outer edge having a combined upstanding retaining wall and conduit, said combined retaining wall and conduit having spaced slots in one side thereof, and devices connected to the retaining wall and conduit through said spaced slots, one of said devices having swinging connection with the retaining wall and conduit.

13. In a work conveyor, the combination with an endless conveyor, of a framework including frame sections over which the endless conveyor is adapted to travel, and a work support connected to the framework and including spaced, fixed side sections which project laterally beyond opposite sides of the framework and a removable intermediate section disposed when in position substantially horizontally with the side sections.

14. In a work conveyor, the combination with an endless conveyor, of a framework including frame sections over which the endless conveyor is adapted to travel, and a work support connected to the framework and including spaced, fixed side sections which project laterally beyond opposite sides of the framework and a removable intermediate section disposed when in position substantially horizontally with the side sections, the transverse frames having recesses in opposite sides between the upper and lower ends thereof so as to permit unobstructed access to the intermediate work support section or to the lower lap of the conveyor if said intermediate section is removed from its normal position.

15. In a work conveyor, the combination with a framework including transverse frame sections, of an endless belt conveyor operable above and below said frame sections, and a work support arranged below the upper lap of the conveyor belt and in a horizontal plane substantially level with the plane of the lower lap of the conveyor belt and including fixed side sections and a removable intermediate section which is disposed in horizontal parallelism with the lower lap of the conveyor belt and which when removed from between the side sections permits the lower lap of the conveyor belt to convey articles on the lower lap through the framework.

WALTER A. ADAMS.